(12) United States Patent
Wohlfarth

(10) Patent No.: US 6,651,788 B1
(45) Date of Patent: Nov. 25, 2003

(54) BOTTOM VALVE FOR TWIN-TUBE SHOCK ABSORBERS FOR MOTOR VEHICLES

(76) Inventor: Klaus Wohlfarth, Justin-Kerner-Strasse 41, Murrhardt (DE), D-71540

( * ) Notice: Subject to any disclaimer, the term of this patent is extended or adjusted under 35 U.S.C. 154(b) by 0 days.

(21) Appl. No.: 09/856,360

(22) PCT Filed: Nov. 23, 1999

(86) PCT No.: PCT/DE99/03787

§ 371 (c)(1),
(2), (4) Date: Sep. 10, 2001

(87) PCT Pub. No.: WO00/31435

PCT Pub. Date: Jun. 2, 2000

(30) Foreign Application Priority Data

Nov. 23, 1998 (DE) .......................... 198 53 854

(51) Int. Cl.$^7$ ................................. F16F 9/34
(52) U.S. Cl. ................................. 188/322.14
(58) Field of Search ................. 188/322.14, 322.15, 188/266.6

(56) References Cited

U.S. PATENT DOCUMENTS 4,709,791 A * 12/1987 Houghton .............. 188/322.14
4,880,086 A   11/1989 Knecht et al. ......... 188/322.14
5,301,776 A * 4/1994 Beck .................... 188/322.13
5,542,509 A * 8/1996 Bell ..................... 188/322.14

FOREIGN PATENT DOCUMENTS

| DE | 3807322 | 7/1989 |
| DE | 8529250 | 4/1990 |
| DE | 4108026 | 9/1992 |
| DE | 4137403 | 5/1993 |
| DE | 19706683 | 7/1998 |
| DE | 19542293 | 8/1998 |
| DE | 19722216 | 8/1999 |
| DE | 19724328 | 8/2000 |
| EP | 0542282 | 5/1993 |
| EP | 0561404 | 9/1993 |

* cited by examiner

Primary Examiner—Matthew C. Graham
(74) Attorney, Agent, or Firm—Lowe Hauptman Gilman & Berner LLP

(57) ABSTRACT

The invention relates to a bottom valve for a motor-vehicle double-tube shock absorber and comprising a main damping valve (8) and a bypass control borehole (5). A prestressed bypass valve (10) operating as a pressure relieve valve is associated to the control borehole (5) and allows adjusting the characteristic damping line between the shock-absorber compression rate of 0 m/s and the opening point OP of the main damping valve (8).

2 Claims, 2 Drawing Sheets

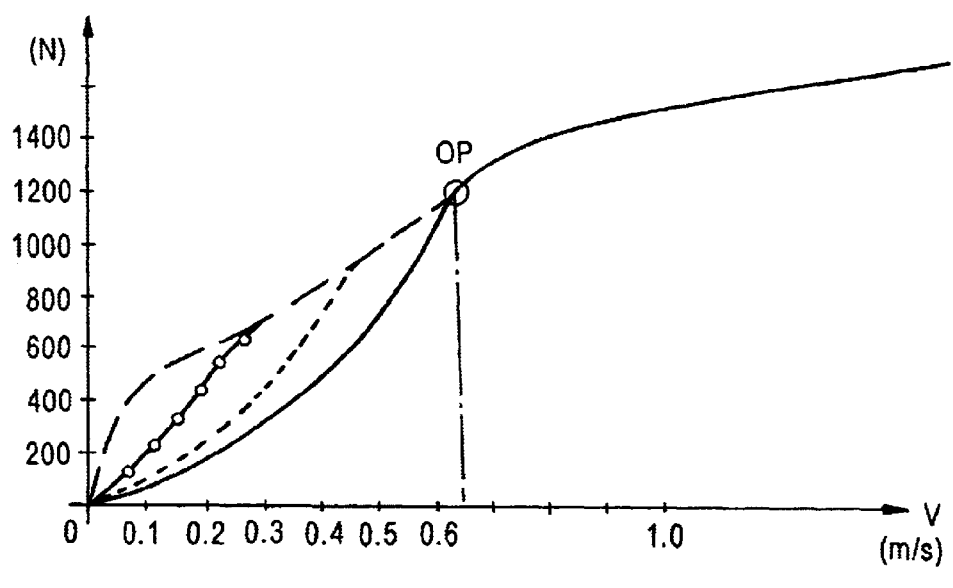

BOTTOM VALVE FOR TWIN-TUBE SHOCK ABSORBERS FOR MOTOR VEHICLES

FIELD OF THE INVENTION

The invention relates to a bottom valve, defined in the preamble of claim 1, for a motor-vehicle double-tube shock absorber.

BACKGROUND OF THE INVENTION

As regards such a bottom valve, the quantity of oil displaced by the piston dipping into the oil generates the pressure-damping force. In general this feature is implemented using variably prestressed valves, disks or packs of disks in cooperation with boreholes and/or similar aperture's cross-sections.

SUMMARY OF THE INVENTION

The objective of the invention is to create a bottom valve also suitable for higher damping forces and exhibiting the feature that the damping characteristic line can be adjusted between the shock absorber's compression speed of 0 m/s and the opening point OP of the main damping valve.

This goal is attained by a bottom valve includes a main damping valve for the main-force control borehole and a bypass control-borehole which determines the damping behavior before the main damping valve is opened. A prestressed bypass valve acting as a pressure relief valve cooperates with this bypass borehole. By appropriately positioning this bypass valve and/or selecting the prestressing spring for it, it is possible to attain a desired damping characteristic line until the main damping valve is opened. Advantageously the bypass valve shall be set at a fixed prestressing force at its adjustment height relative to the control borehole using an adjustment bolt accessible outside the shock absorber.

BRIEF DESCRIPTION OF THE DRAWINGS

The invention is elucidated below in relation to the attached drawings.

FIG. 2 shows the characteristic lines for the bypass valve at different setpoints.

DETAILED DESCRIPTION OF THE DRAWINGS

Figure 1:
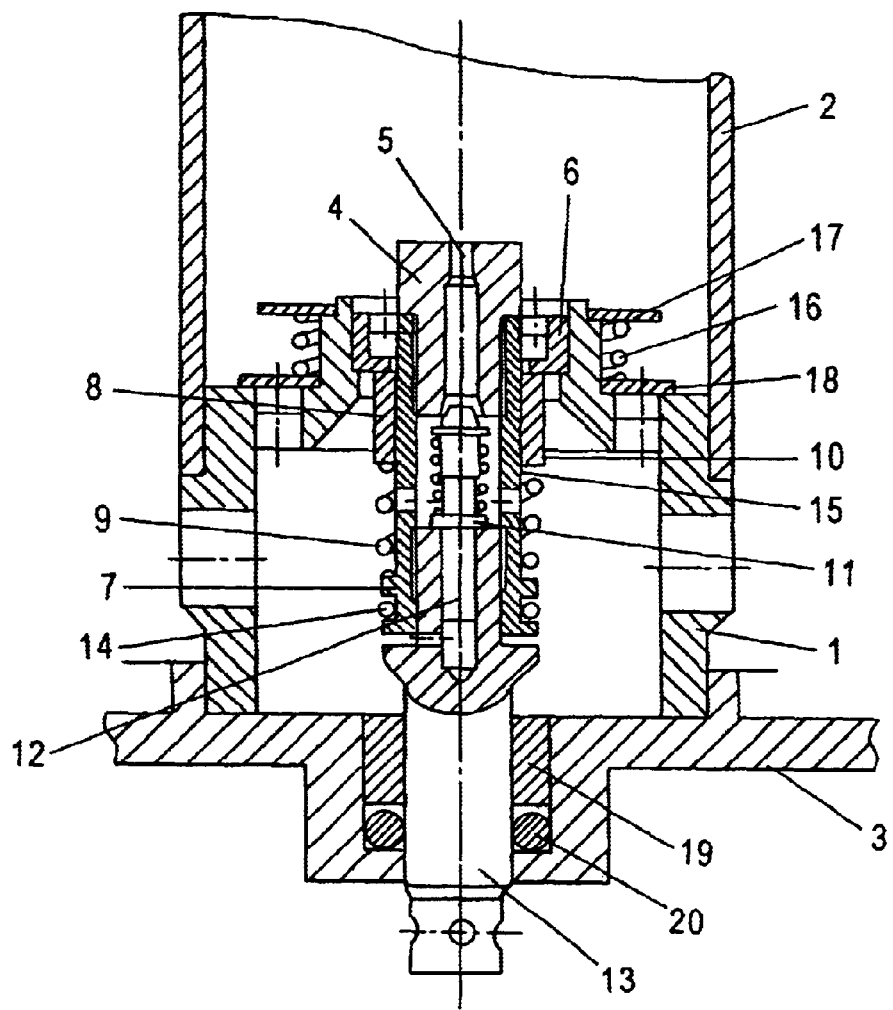
FIG. 1 shows a cross-section of a bottom valve of the invention.

The bottom-valve housing 1 is configured at the lower end of the inner damping tube 2. Only a cutaway of the outer tube 3 is shown. The main damping valve is received centrally in the bottom-valve housing 1 and consists of a valve head 6 and of a valve case 8 which is prestressed by a spring 9 and which closes the valve aperture in the valve head 6. The valve case 8 is displaceably mounted on a support 7 which also supports the spring 9 at the site 14. A bolt 4 fitted with a bypass control-borehole 5 is mounted in the support 7.

A bypass valve 10 cooperates with the control borehole 5 and is prestressed by a spring 15. By its shank, the bypass valve 10 is received in a borehole-seat of an adjustment bolt 13 which is accessible from the outside of the shock absorber and which is screwed into the support 7. The adjustment bolt 13 is conventionally sealed relative to the outside tube 3 by a sealing bush 19 and an O-ring 20.

The prestressing spring 15 of the bypass valve 10 rests at one end on the valve head which is opposite the control borehole 5 and at the other end on a disk 11 which is displaceably seated on the valve stem and kept by the said spring against a shoulder at the valve stem. At the same time the disk 11 rests against the front end of the adjustment bolt 13. The shoulder is constituted by a sliding bush 12 screwed onto the valve stem which supports latter in the receiving borehole of the adjustment bolt 13.

The valve disk of the return valve is denoted by 18. The prestressing spring of said valve disk is denoted by 16 and rests on a retaining disk 17 which in turn is affixed to the bottom-valve housing 1.

The bottom valve operates as follows:

The main damping valve 8 is prestressed by the spring 9 against the valve head 6. As the rate of shock-absorber compression increases, the control borehole 5 in the bolt 4 will generate that pressure which allows opening the main damping valve. This basic characteristic line is shown solid in FIG. 2, OP denoting the opening point of the main damping valve.

The adjustment bolt 13 modifies the bypass valve 10 relative to the control borehole 5 and as a result one damping force produced by the prestressing spring 15 can be allocated to different rates of shock-absorber compression. Said damping force may be shifted between the 0 m/s rate of shock absorber compression and the opening point OP of the main damping valve as shown in FIG. 2. Both the main damping valve and the bypass valve operate in the manner of a pressure-relief valve and thereby implement the decelerating function of the force vs rate plot, allowing riding comfort combined with safety, curve-riding stability and braking stability.

By selecting prestressing springs 15 of different compliances, the characteristic damping line may be controlled even more.

What is claimed is:

1. A bottom valve for a motor-vehicle double-tube shock absorber, said valve comprising a main damping valve (8), a bypass control borehole (5), and a prestressed bypass valve (10);

said bypass valve, associated with said bypass control borehole (5), acting as a pressure relief valve of which the action can be adjusted from outside the shock absorber, said bypass valve comprising a valve head, a valve stem connected to the valve head, and a prestressing spring (15);

wherein a spacing between the valve head of said bypass valve (10) and said bypass control borehole (5) is adjustable by means of an adjustment bolt (13) accessible from outside the shock absorber, whereby said bypass valve (10) can be adjusted at a defined setpoint of prestressing by said adjustment bolt (13);

the bypass valve (10) is displaceably received by said valve stem in a receiving borehole of the adjustment bolt (13); and the prestressing spring (15) rests at one end against the valve head opposite the bypass control borehole (5) and at the other end against a disk (11), said disk being displaceably mounted on the valve stem and retained by the prestressing spring (15) against a shoulder at the valve stem.

2. The bottom valve as claimed in claim 1, wherein the shoulder is present on a slide bush (12) screwed onto the valve stem; and the valve stem by means of said bush is supported in the receiving borehole of the adjustment bolt (13).

* * * * *